US012700261B2

(12) United States Patent
Boskovich et al.

(10) Patent No.: US 12,700,261 B2
(45) Date of Patent: Aug. 4, 2026

(54) MARKERLESS MOTION CAPTURE

(71) Applicant: WowYow, Inc., San Diego, CA (US)

(72) Inventors: Adam Boskovich, San Diego, CA (US); Jarett Boskovich, San Diego, CA (US); Michael Ramirez, San Diego, CA (US); Warren James Pretorius, San Diego, CA (US); Gary Twait, San Diego, CA (US)

(73) Assignee: WowYow, Inc., San Diego, CA (US)

( * ) Notice: Subject to any disclaimer, the term of this patent is extended or adjusted under 35 U.S.C. 154(b) by 258 days.

(21) Appl. No.: 18/667,818

(22) Filed: May 17, 2024

(65) Prior Publication Data

US 2024/0386750 A1 Nov. 21, 2024

Related U.S. Application Data

(60) Provisional application No. 63/467,779, filed on May 19, 2023.

(51) Int. Cl.
| | |
|---|---|
| *G06V 40/20* | (2022.01) |
| *G06V 10/26* | (2022.01) |
| *G06V 20/40* | (2022.01) |
| *G06V 20/64* | (2022.01) |

(52) U.S. Cl.
CPC ............ *G06V 40/23* (2022.01); *G06V 10/267* (2022.01); *G06V 20/46* (2022.01); *G06V 20/64* (2022.01)

(58) Field of Classification Search
CPC ...... G06V 40/23; G06V 10/267; G06V 20/46; G06V 20/64; G06V 10/46; G06V 40/165; G06V 10/82; G06V 10/454; G06V 10/764; G06V 40/171; G06V 10/25; G06V 10/44; G06V 10/462; G06V 10/757; G06V 10/7715; G06N 3/0464; G06N 3/09; G06N 3/045; G06N 20/00; G06N 3/08; G06T 2207/10028; G06T 2207/20081; G06T 2207/20084; G06T 7/246; G06T 7/73; G06T 7/75
See application file for complete search history.

(56) References Cited

U.S. PATENT DOCUMENTS

| | | | |
|---|---|---|---|
| 10,108,867 B1 * | 10/2018 | Vallespi-Gonzalez ..................... G06V 20/58 |
| 11,227,395 B2 * | 1/2022 | Xie .......................... G06T 7/269 |
| 11,715,213 B2 * | 8/2023 | Leung .................... G06V 10/22 382/103 |

(Continued)

*Primary Examiner* — Michael S Osinski

(74) *Attorney, Agent, or Firm* — Procopio, Cory, Hargreaves & Savitch LLP

(57) ABSTRACT

A system for markerless motion capture may include an image capture apparatus that obtains video including live movement of one or more subjects. An estimation module analyzes frames of the video and estimates the location of a plurality of keypoints on each of the subjects. A propagation module applies the keypoints corresponding to a first subject to the first subject additional frames of the video. The propagation module does the same for additional subjects in the video. A conversion module converts the plurality of keypoints from each frame of the video into a digital media file having a first file format and then converts the digital media file in the first file format into a digital media file having second file format. The system also includes a data storage apparatus configured to save the digital media files in the first and second file formats.

20 Claims, 10 Drawing Sheets

(56)         References Cited

U.S. PATENT DOCUMENTS

| | | | | | |
|---|---|---|---|---|---|
| 11,915,434 | B2 * | 2/2024 | Bottos | | G06T 7/248 |
| 12,125,326 | B1 * | 10/2024 | Xenakis | | B60W 50/10 |
| 12,498,228 | B1 * | 12/2025 | Gibson | | B60W 60/001 |
| 2014/0348385 | A1 * | 11/2014 | Kozicz | | F16P 3/142 |
| | | | | | 382/103 |
| 2015/0243016 | A1 * | 8/2015 | Moteki | | G06T 7/70 |
| | | | | | 382/103 |
| 2015/0350488 | A1 * | 12/2015 | Morioka | | H04N 23/69 |
| | | | | | 348/208.1 |
| 2016/0080661 | A1 * | 3/2016 | Morioka | | G06T 7/20 |
| | | | | | 348/239 |
| 2018/0268256 | A1 * | 9/2018 | Di Febbo | | G06V 10/82 |
| 2019/0138822 | A1 * | 5/2019 | Yao | | G01S 17/931 |
| 2019/0303686 | A1 * | 10/2019 | Guo | | G06V 10/75 |
| 2021/0366076 | A1 * | 11/2021 | He | | G06V 10/764 |
| 2021/0405651 | A1 * | 12/2021 | Pan | | G05D 1/227 |
| 2022/0076059 | A1 * | 3/2022 | Mahbub | | G06N 3/045 |
| 2022/0101556 | A1 * | 3/2022 | Zhang | | G06V 20/52 |
| 2022/0215201 | A1 * | 7/2022 | Dwivedi | | G06V 10/764 |
| 2022/0237402 | A1 * | 7/2022 | Unnikrishnan | | G06V 20/58 |
| 2022/0319234 | A1 * | 10/2022 | Hu | | G06T 7/70 |
| 2023/0145561 | A1 * | 5/2023 | Miao | | G06T 7/80 |
| | | | | | 382/100 |
| 2023/0161924 | A1 * | 5/2023 | Shevchenko | | G06N 3/08 |
| | | | | | 706/15 |
| 2023/0267486 | A1 * | 8/2023 | Jo | | G06V 20/52 |
| | | | | | 705/7.33 |
| 2023/0314165 | A1 * | 10/2023 | Okuma | | G01C 21/3811 |
| | | | | | 701/461 |
| 2024/0203557 | A1 * | 6/2024 | Yoon | | G16H 10/60 |
| 2024/0212308 | A1 * | 6/2024 | Li | | G06V 10/267 |
| 2024/0282115 | A1 * | 8/2024 | Costantino | | G06V 20/64 |
| 2024/0412402 | A1 * | 12/2024 | Fujiwaka | | G06T 7/70 |
| 2024/0412485 | A1 * | 12/2024 | Agbaryah | | G06F 30/13 |
| 2025/0182526 | A1 * | 6/2025 | Wang | | G06V 40/171 |
| 2026/0042463 | A1 * | 2/2026 | Jarquin Arroyo | | B60W 60/001 |

* cited by examiner

100

800

805 — ANALYZE SEQUENCE OF FRAMES

810 — IDENTIFY SUBJECT(S) IN FRAMES

815 — DETERMINE KEYPOINTS ON EACH SUBJECT

820 — APPLY SUBJECT KEYPOINTS TO ALL FRAMES

825 — IDENTIFY MOVEMENT PATTERN

830 — ASSOCIATE TAG WITH MOVEMENT PATTERN

835 — STORE MOVEMENT PATTERN

900

1000

1005 — ANALYZE SEQUENCE OF FRAMES

1010 — IDENTIFY SUBJECT(S) IN FRAMES

1015 — DETERMINE KEYPOINTS ON EACH SUBJECT

1020 — APPLY SUBJECT KEYPOINTS TO ALL FRAMES

1025 — IDENTIFY MOVEMENT PATTERN

1030 — COMPARE MOVEMENT PATTERN TO KNOWN PATTERNS

1035 — REPORT RESULTS OF ANALYZED MOVEMENT PATTERN

MARKERLESS MOTION CAPTURE

RELATED APPLICATION

The present application claims the benefit of U.S. provisional patent application No. 63/467,779 filed May 19, 2023, which is incorporated herein by reference in its entirety.

BACKGROUND

Field of the Invention

The present disclosure is generally directed toward the transformation of physical motion into digital media motion.

Related Art

Conventional motion capture is an expensive and time-consuming process. Specialized motion capture ("mocap") studios charge tens of thousands of dollars per day to carefully set up the environment in which desired physical motion is to occur and to capture and digitize that physical motion. Adding to the time-consuming and costly conventional motion capture process is the requirement that mocap studios hire talent to be in the studio in order to capture their motion. Moreover, conventional mocap studios require a large number of very expensive high-end cameras and require the hired talent to wear a specialized suit with markers attached. And increasing the already time-consuming process is the significant computer processing that is required after capturing the physical motion in order to generate the motion capture output, which requires multiple engineers and support staff to transform the physical motion into a useable product for their clients.

Not only is the conventional motion capture process time-consuming and expensive, the requirement that mocap takes place in a highly controlled and carefully staged studio environment presents significant challenges for those who are not able to travel to the studio location. The requirement that mocap takes place in a highly controlled and carefully staged studio environment also completely prohibits on-site motion capture that may be desired, for example, by a director who wants to capture motion at a specific location for a production.

Therefore, what is needed is a system and method that overcomes these significant problems found in conventional motion capture as described above.

SUMMARY

In some aspects, the techniques described herein relate to a system for markerless motion capture including an image capture apparatus that is configured to obtain video including live movement of a first subject. The video is made up of a plurality of sequential frames. The system also includes an estimation module that is configured to analyze each frame of the video and apply a bounding box to the first subject in each frame and estimate the location of a plurality of keypoints on the first subject in each bounding box. The same process is used for additional subjects/moving objects in the video. The system also includes a conversion module that is configured to convert the plurality of keypoints from each frame of the video containing at least one keypoint into a digital media file having a first file format. The conversion module is also configured to convert the digital media file in the first file format into a digital media file having a second file format. The conversion module may also convert the plurality of keypoints directly to a digital media file having a second file format. The system also includes a data storage apparatus configured to save the digital media file in the first file format and save the digital media file in the second file format.

In some aspects, the techniques described herein relate to a system, wherein the image capture apparatus is a camera configured to capture live movement of the first subject.

In some aspects, the techniques described herein relate to a system, wherein the first file format is a biovision hierarchy (BVH) format.

In some aspects, the techniques described herein relate to a system, wherein the second file format is a Filmbox (FBX) format.

In some aspects, the techniques described herein relate to a system, further including a pattern module configured to analyze a plurality of keypoints in a plurality of sequential frames of the video and identify a movement pattern including a relative position of a plurality of keypoints in a plurality of sequential frames.

In some aspects, the techniques described herein relate to a system, wherein the image capture apparatus further configured to obtain video including live movement of a plurality of subjects.

In some aspects, the techniques described herein relate to a system, wherein the movement pattern includes the relative position of a first plurality of keypoints corresponding to a first subject in a plurality of sequential frames and the relative position of second plurality of keypoints corresponding to a second subject in the plurality of sequential frames.

In some aspects, the techniques described herein relate to a system, wherein the conversion module is further configured to convert the plurality of keypoints from each frame of the video containing at least one keypoint into the digital media file having the second file format.

In some aspects, the techniques described herein relate to a system, wherein the conversion module is further configured to improve smoothness of motion in the digital media file having the first file format by converting the digital media file having the first file format into a reconverted plurality of keypoints and converting the reconverted plurality of keypoints into an improved digital media file having the first file format.

In some aspects, the techniques described herein relate to a system, wherein the plurality of keypoints on the first subject represent the first subject in three dimensional space.

In some aspects, the techniques described herein relate to a method for converting markerless motion capture. The method includes obtaining video including live movement of a first subject, where the video includes a plurality of sequential frames. The method also includes identifying the first subject in one or more frames of the video, applying a bounding box around the first subject in each of the one or more frames of the video, and estimating a location for each of a plurality of keypoints on the first subject in each bounding box around the first subject in each of the one or more frames of the video. The method also includes converting the plurality of keypoints from each frame of the video containing at least one keypoint into a digital media file having a first file format. The method also includes converting the digital media file in the first file format into a digital media file having second file format. The method also includes storing the digital media file in the first file format and storing the digital media file in the second file format.

In some aspects, the techniques described herein relate to a method, wherein the video is obtained from a live video feed.

In some aspects, the techniques described herein relate to a method, wherein the video is prerecorded and obtained from data storage.

In some aspects, the techniques described herein relate to a method, wherein the first file format is a biovision hierarchy (BVH) format.

In some aspects, the techniques described herein relate to a method, wherein the second file format is a Filmbox (FBX) format.

In some aspects, the techniques described herein relate to a method, further including analyzing a plurality of keypoints in a plurality of sequential frames of the video to identify a movement pattern, wherein the movement pattern includes relative positions of a plurality of keypoints in a plurality of sequential frames.

In some aspects, the techniques described herein relate to a method, wherein the movement pattern includes the relative position of a first plurality of keypoints corresponding to a first subject in a plurality of sequential frames and the relative position of second plurality of keypoints corresponding to a second subject in the plurality of sequential frames.

In some aspects, the techniques described herein relate to a method, further including, prior to converting the plurality of keypoints to the first file format and prior to converting the plurality of keypoints to the second file format, adjusting a location of a first keypoint in a first frame relative to a location of the first keypoint in a second frame that is adjacent to the first frame such that a distance between the first keypoint in the first frame and a second keypoint in the first frame is substantially equal to a distance between the first keypoint in the second frame and the second keypoint in the second frame.

In some aspects, the techniques described herein relate to a method, further including converting the digital media file having the first file format into a reconverted plurality of keypoints and converting the reconverted plurality of keypoints into an improved digital media file having the first file format.

In some aspects, the techniques described herein relate to a method, wherein the plurality of keypoints on the first subject represent the first subject in three dimensional space.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

4

Figure 4:
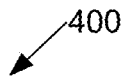
Figure 4:
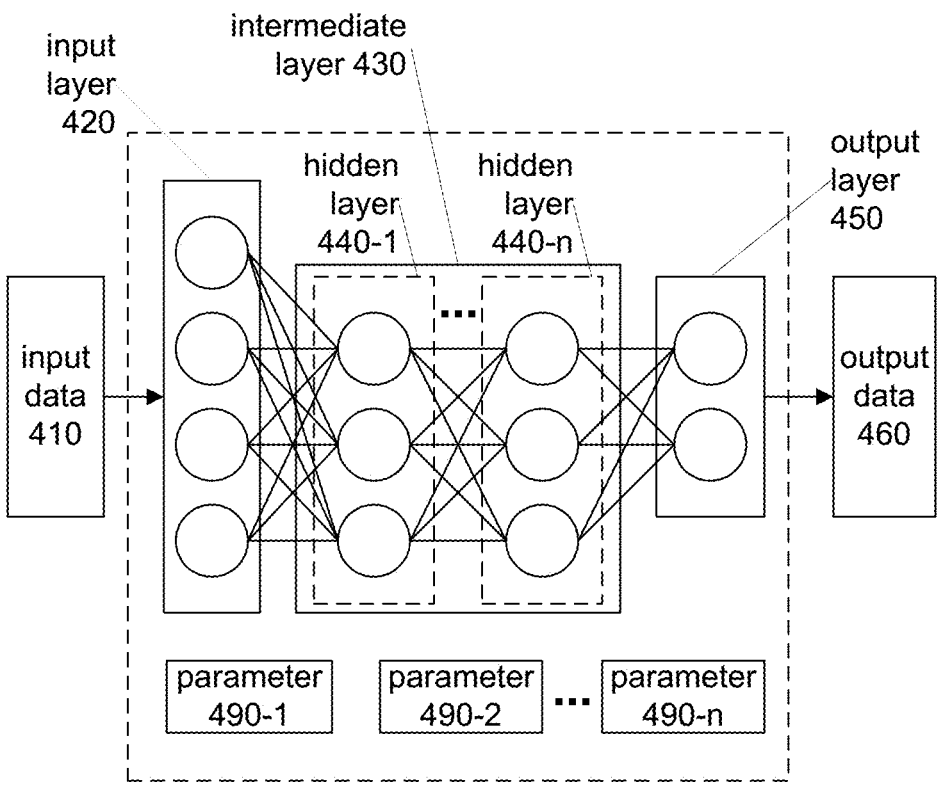
Figure 5:
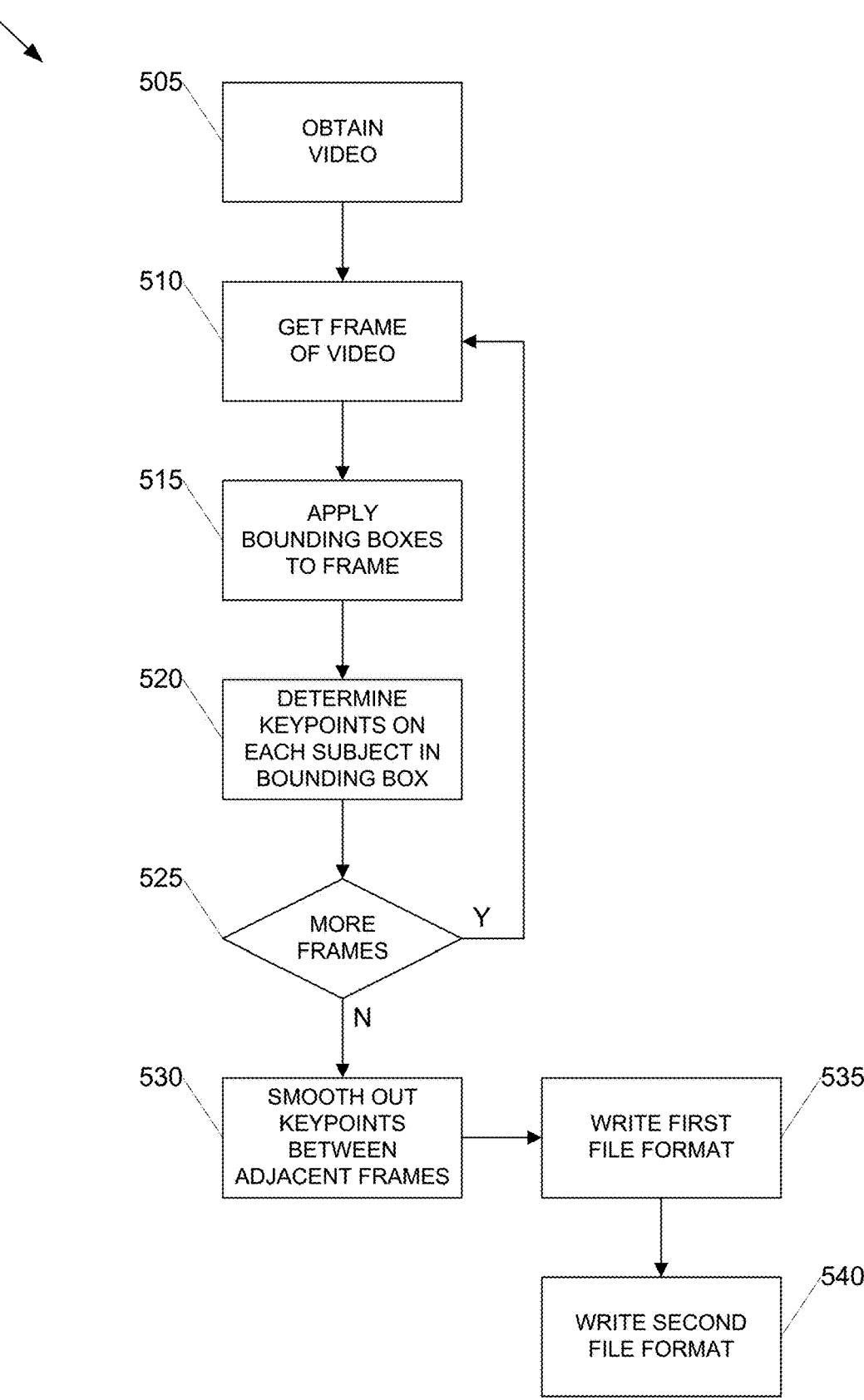
Figure 6:
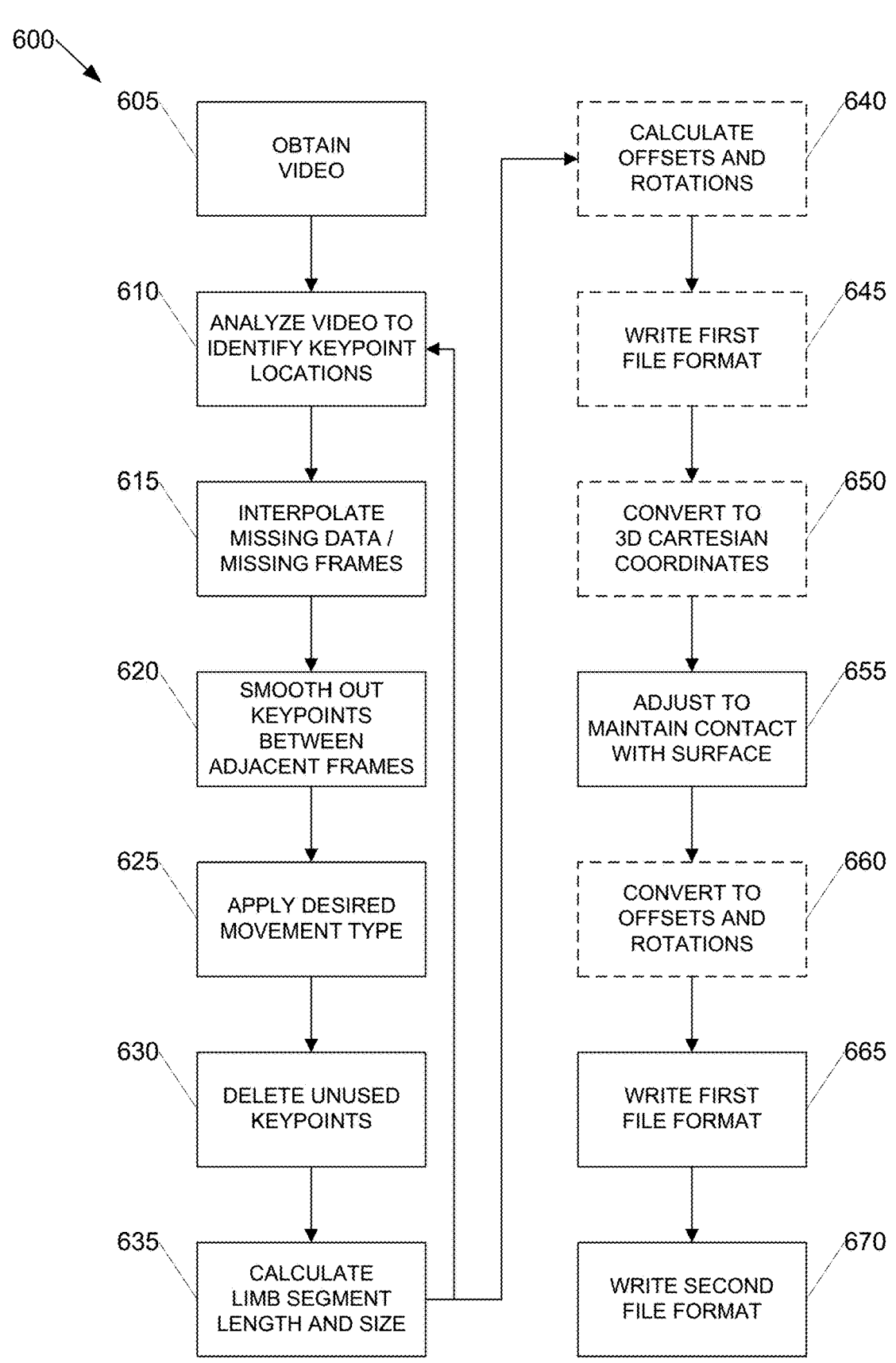
Figure 7:
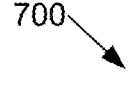
Figure 7:
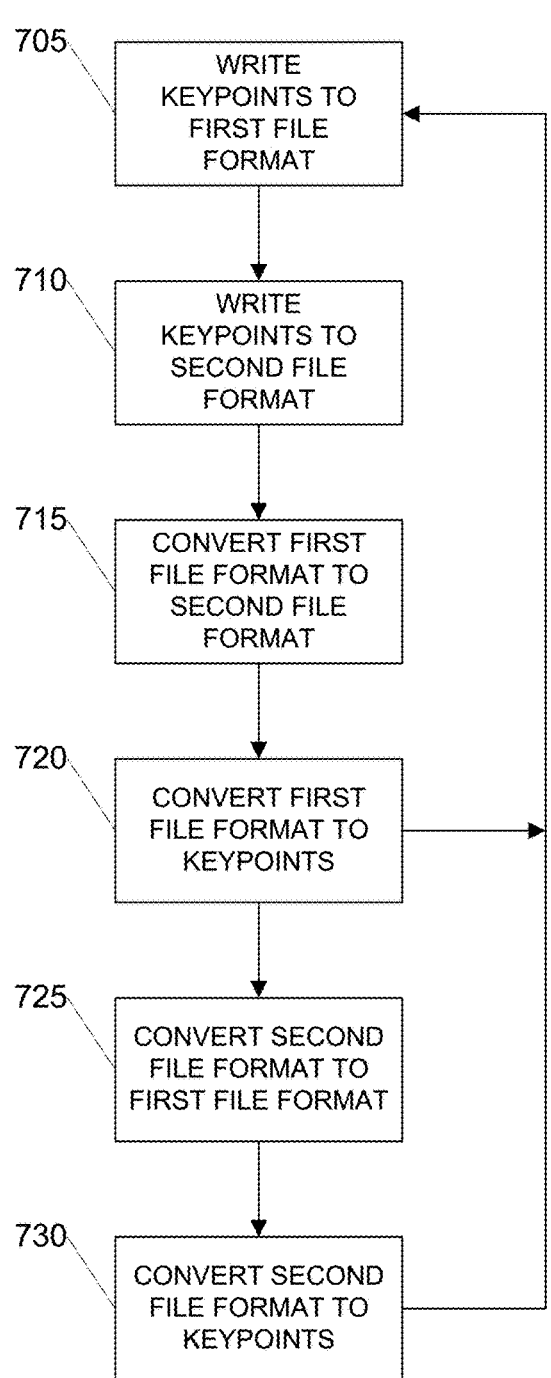
Figure 8:
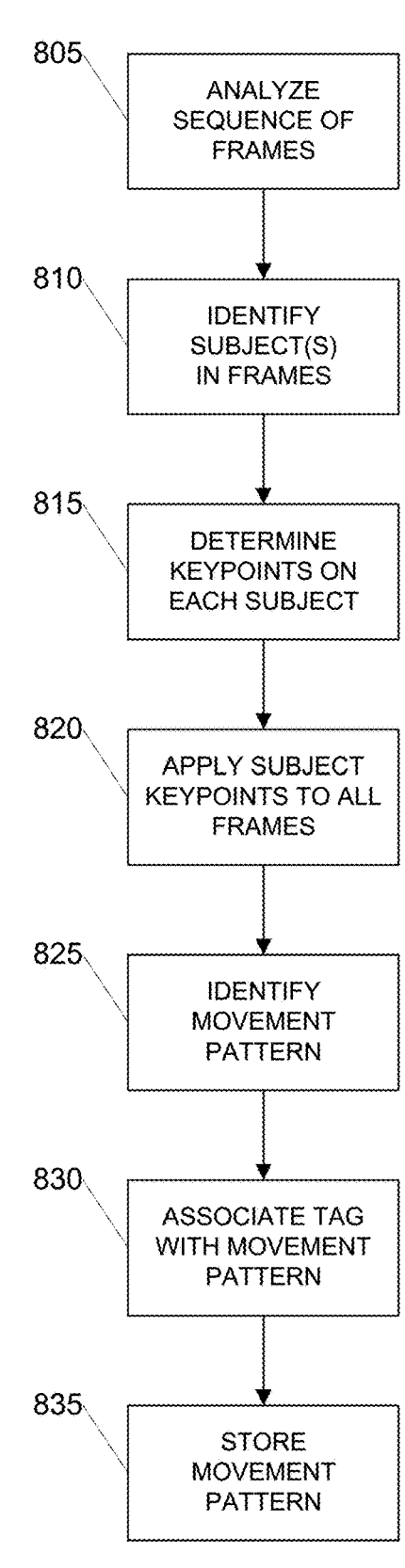
Figure 9:
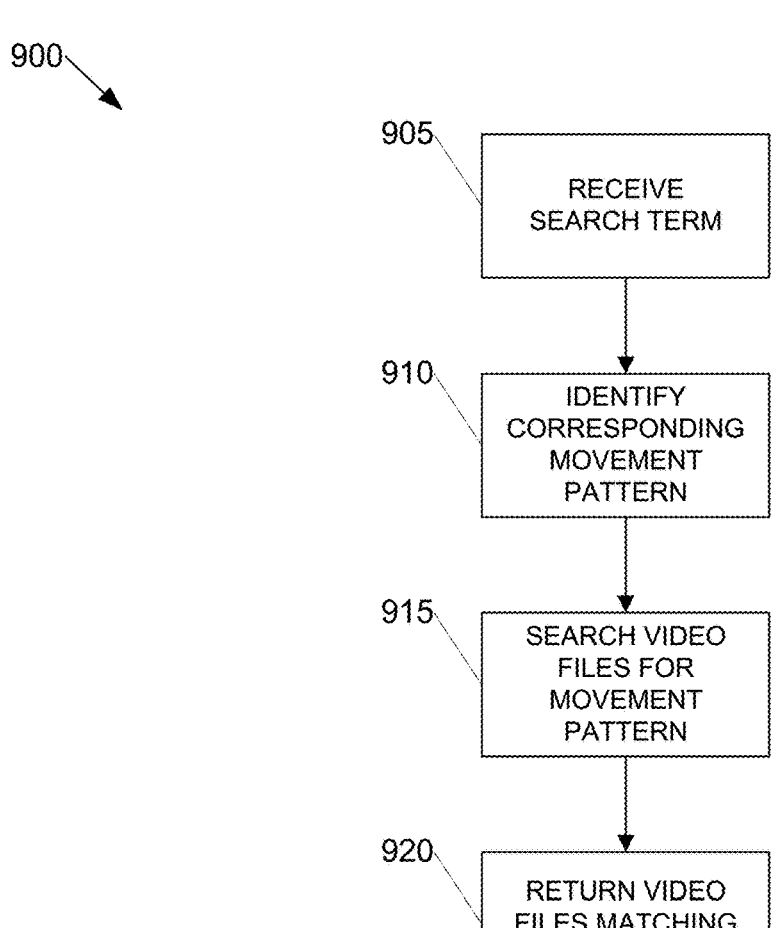
Figure 10:
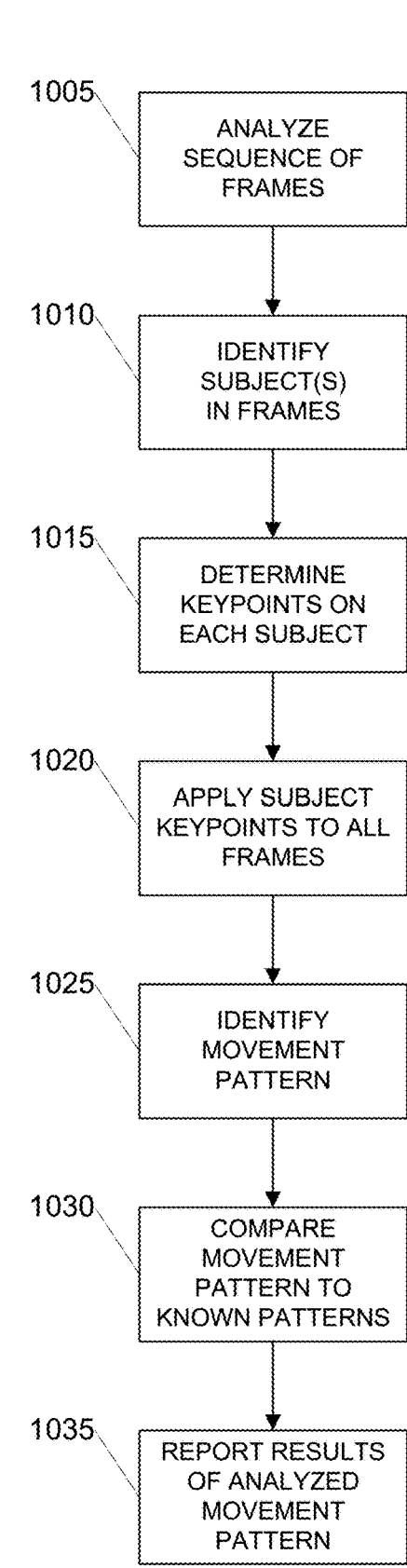

FIG. 4 illustrates an example operation of an example artificial neural network, by which one or more of the processes described herein may be executed, according to an embodiment;

FIG. 5 is a flow diagram illustrating an example process for converting a video stream to a digital media file having a preferred file format according to an embodiment of the invention;

FIG. 6 is a flow diagram illustrating an alternative example process for converting a video stream to a digital media file having a preferred file format according to an embodiment of the invention;

FIG. 7 is a flow diagram illustrating an example process for converting keypoints from a video stream to one or more digital media files having a preferred file format and converting the one or more digital media files having a preferred file format to other preferred file formats and converting the one or more digital media files having a preferred file format back to keypoints according to an embodiment of the invention;

FIG. 8 is a flow diagram illustrating an example process for generating a movement pattern according to an embodiment of the invention;

FIG. 9 is a flow diagram illustrating an example process for searching video for matching movement patterns according to an embodiment of the invention;

FIG. 10 is a flow diagram illustrating an example process for analyzing a video stream to identify desirable or undesirable movement patterns according to an embodiment of the invention;

DETAILED DESCRIPTION

Disclosed herein are systems, methods, and non-transitory computer-readable media for transforming physical motion into digital media motion. For example, one method disclosed herein allows for the physical movement of a subject to be captured and transformed into digital media and the digital media analyzed to identify keypoints on the subject. The keypoints on the subject are applied to the same subject in subsequent frames of the digital media and the keypoints are then used to generate motion capture output in one or more formats.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. System Overview
1.1. Infrastructure

Figure 1:
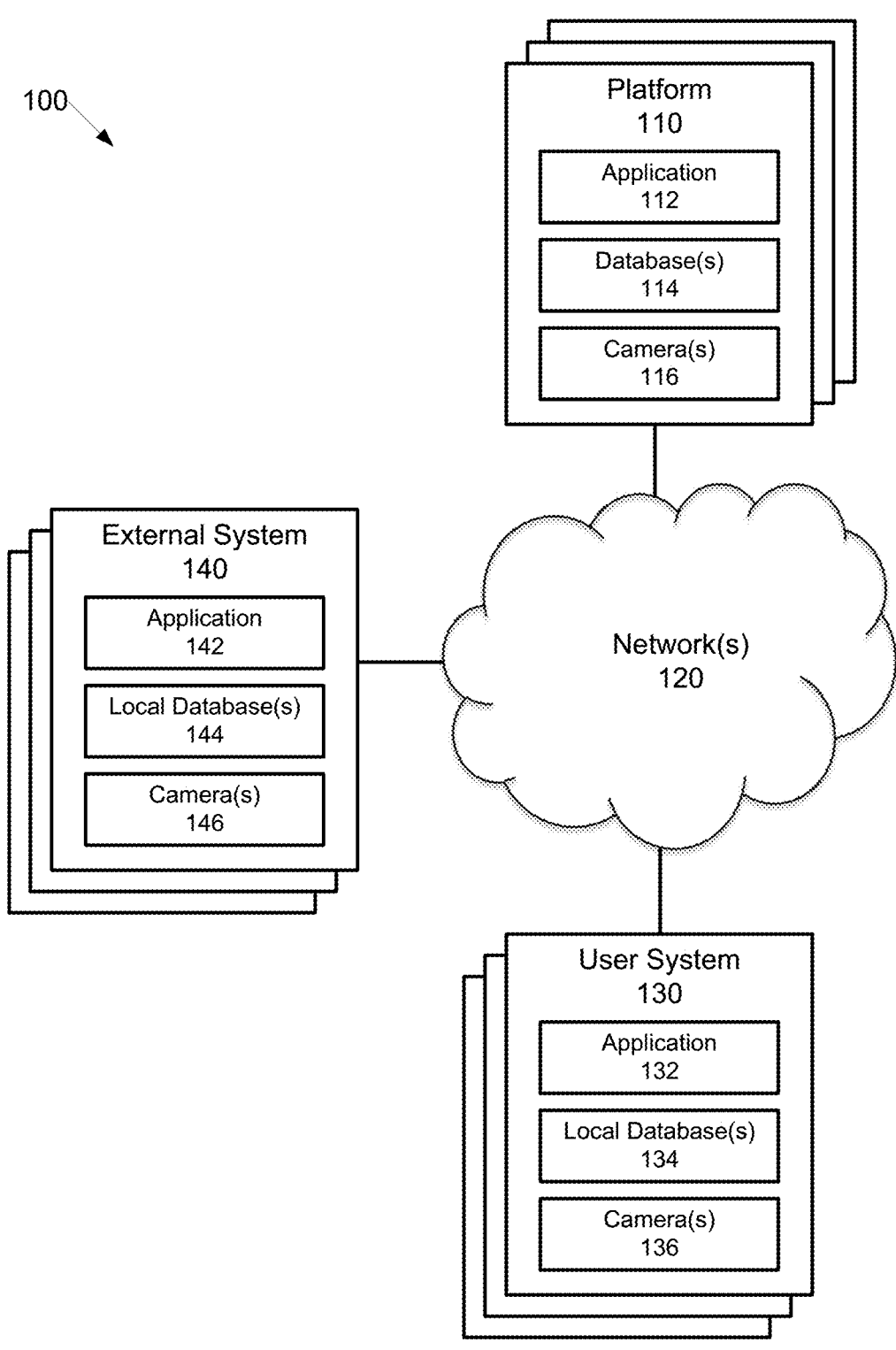
FIG. 1 illustrates an example infrastructure, in which one or more of the processes described herein may be implemented, according to an embodiment.

FIG. 1 illustrates an example infrastructure 100 in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated special purpose servers, or may instead comprise cloud instances, which utilize shared resources of one or more special purpose servers. These special purpose servers or cloud instances may be collocated and/or geographically distributed. Platform 110 may also comprise or be communicatively connected to a server application 112 and/or one or more databases 114 and/or one or more cameras 116. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks 120. For example, platform 110 may be connected to a subset of user systems 130 and/or external systems 140 via the Internet, but may be connected to one or more other user systems 130 and/or external systems 140 via an intranet. Furthermore, while only a few platforms 110 (with server application 112, database(s) 114, and camera(s) 116), and only a few user systems 130 (with application 132, local database(s) 134, and camera(s) 136), and only a few external systems 140 (with application 142, local database(s) 144, and camera(s) 146) are illustrated, it should be understood that the infrastructure may comprise any number of platforms 110, user systems 130, and external systems 140.

User system(s) 130 may comprise any type or types of special purpose computing devices. Such special purpose user systems are capable of wired and/or wireless communication and may include, for example, certain desktop computers, certain laptop computers, certain tablet computers, certain smart phones, certain mobile phones, certain servers, certain head mounted displays, and/or certain other special purpose computing devices that are configured to carry out certain aspects of the systems and method disclosed herein. For example, in one aspect, user system 130 includes one or more cameras 136 that allow user system 130 to capture and store video and send prerecorded video content and/or livestream video content to platform 110 via network 120.

Platform 110 may comprise certain web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130, external system 140, or server application 112 executing on platform 110 may submit data (e.g., user data, form data, etc.) to be stored in database(s) 114, and/or request access to data stored in database(s) 114. A variety of special purpose database implementations may be utilized, including without limitation MySQL™, Oracle™, IBM™, Microsoft SQL™, Access™, PostgreSQL™, and the like, including cloud-based databases and proprietary databases that are configured to carry out certain aspects of the systems and method disclosed herein. Data may be sent to platform 110, for instance, using the well-known POST request supported by HTTP, via FTP, and/or the like. This data, as well as other requests, may be handled, for example, by server-side web technology, such as a special purpose servlet or other special purpose software module (e.g., comprised in server application 112), executed by platform 110 and configured to carry out certain aspects of the systems and method disclosed herein.

Platform 110 may further comprise, be communicatively coupled with, or otherwise have access to one or more camera(s) 116. For example, platform 110 may comprise a camera 116 that is configured to capture video content and store the video content in database 114. Additionally, platform 110 may comprise a camera 116 that is configured to capture live video content and provide the live video content to application 112 for real time processing.

In embodiments in which a web service is provided, platform 110 may receive requests from external system(s) 140, and provide responses in extensible Markup Language (XML), JavaScript Object Notation (JSON), and/or any other suitable or desired format. In such embodiments, platform 110 may provide a special purpose application programming interface (API) which defines the manner in which user system(s) 130 and/or external system(s) 140 may interact with the web service to carry out certain aspects of the systems and method disclosed herein. Thus, user system(s) 130 and/or external system(s) 140 (which may themselves be servers), can define their own special purpose user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders content at user system(s) 130, while server application 112 on platform 110 is responsible for generating the content and managing database functions. Alternatively, the client application 132 may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application(s) 132 both perform processing), can comprise one or more executable software modules that implement one or more of the processes, methods, or functions of the application described herein.

User system 130 may further comprise, be communicatively coupled with, or otherwise have access to one or more camera(s) 136. For example, user system 130 may comprise a camera 136 that is configured to capture video content and store the video content in database 134 such that application 132 can process the video content and/or send the video content to the platform 110. Additionally, user system 130 may comprise a camera 136 that is configured to capture live video content and provide the live video content to application 132 for processing or provide the live video content to the platform 110.

External system 140 may further comprise, be communicatively coupled with, or otherwise have access to one or more camera(s) 146. For example, external system 140 may comprise a camera 146 that is configured to capture video content and store the video content in database 144 such that application 142 can process the video content and/or send the video content to the platform 110. Additionally, external system 140 may comprise a camera 146 that is configured to capture live video content and provide the live video content to application 142 for processing or provide the live video content to the platform 110.

1.2. Example Processing Device

Figure 2:
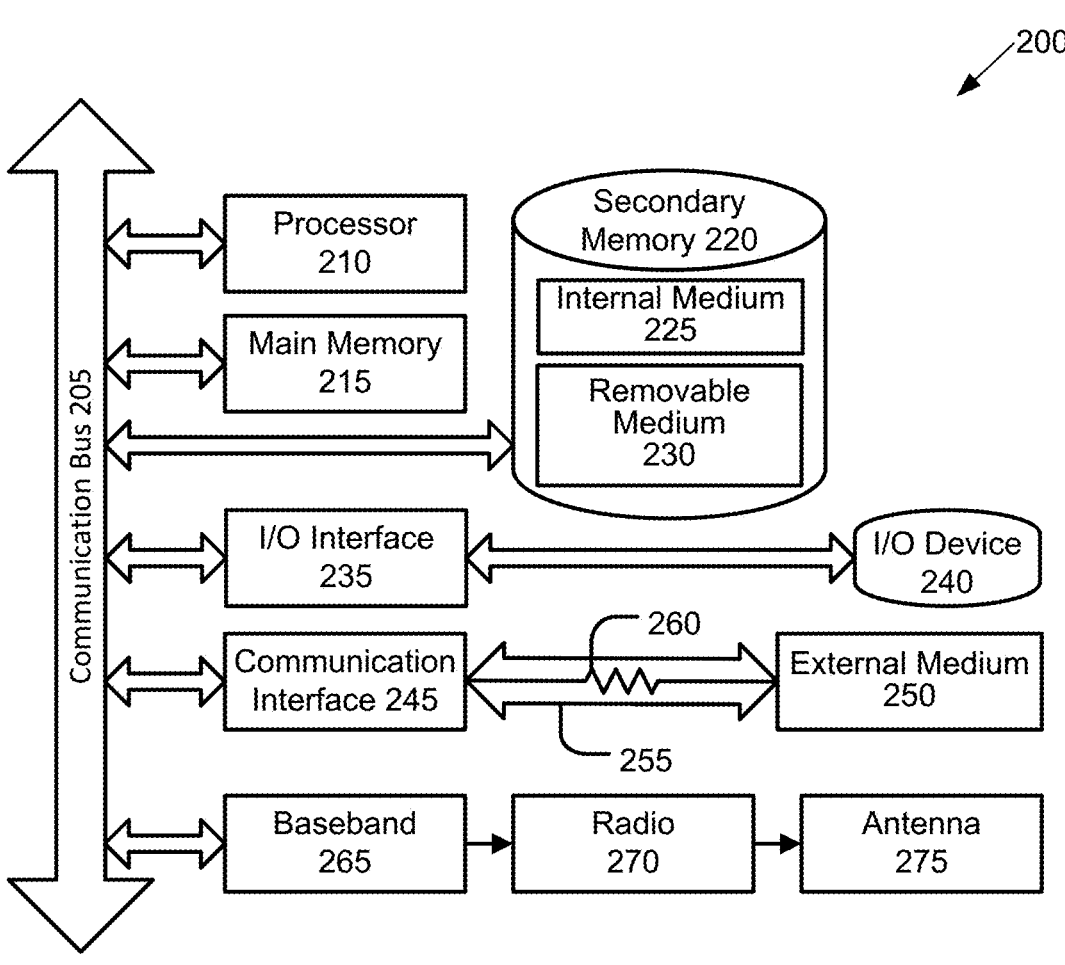
FIG. 2 illustrates an example processing system, by which one or more of the processes described herein may be executed, according to an embodiment.

FIG. 2 is a block diagram illustrating an example special purpose wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other special purpose processing devices described herein. System 200 can be a special purpose server or a special purpose personal computer, or any other special purpose processor-enabled device that is capable of wired or wireless data communication and configured to carry out certain aspects of the systems and method disclosed herein. Other special purpose computer systems and/or architectures may be also used, as will be clear to those skilled in the art, as long as they are capable of wired or wireless data communication and configured to carry out certain aspects of the systems and method disclosed herein.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 245, which allows software and data to be transferred from external storage medium 250 to system 200. Examples of external storage medium 250 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 245. Communication interface 245 allows software and data to be transferred between system 200 and external devices (e.g. printers), networks, or other information sources. For example, computer software or executable code may be transferred to system 200 from a network server (e.g., platform 110) via communication interface 245. Examples of communication interface 245 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 245 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 245 are generally in the form of electrical communication signals 260. These signals 260 may be provided to communication interface 245 via a communication channel 255. In an embodiment, communication channel 255 may be a wired or wireless network (e.g., network(s) 120), or any variety of other communication links. Communication channel 255 carries signals 260 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 245 and stored in main memory 215 and/or secondary memory 220. Such computer programs, when executed, enable system 200 to perform the various functions of the disclosed embodiments as described elsewhere herein.

In this description, the term "computer-readable medium" is used to refer to any special purpose non-transitory computer-readable storage media used to provide computer-executable code and/or other data to or within system 200 to carry out certain aspects of the systems and method disclosed herein. Examples of such media include main memory 215, secondary memory 220 (including internal medium 225, removable medium 230, and external storage medium 250), and any peripheral device communicatively coupled with communication interface 245 (including a network information server or other network device). These special purpose non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 245. In such an embodiment, the software is loaded into system 200 in the form of electrical communication signals 260. The software, when executed by processor 210, causes processor 210 to at least perform one or more of the processes and functions described elsewhere herein.

In an embodiment, I/O interface 235 provides an interface between one or more components of system 200 and one or more input and/or output devices 240. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), head mounted displays (HMDs), and/or the like. In some cases, an input and output device 240 may be combined, such as in the case of a touch panel display (e.g., in a smartphone, tablet, or other mobile device).

In an embodiment, the I/O device 240 may be any type of external or integrated display and may include one or more discrete displays that in aggregate form the I/O device 240. The I/O device 240 may be capable of 2D or 3D presentation of visual information to a user of the system 200. In one embodiment, the I/O device 240 may be a virtual reality or augmented reality device in the form of an HMD worn by the user so the user may visualize the presentation of information in 3D.

System 200 may also include optional wireless communication components that facilitate wireless communication over a voice network and/or a data network (e.g., in the case of user system 130). The wireless communication components comprise an antenna system 275, a radio system 270, and a baseband system 265. In system 200, radio frequency (RF) signals are transmitted and received over the air by antenna system 275 under the management of radio system 270.

In an embodiment, antenna system 275 may comprise one or more antennae and one or more multiplexors (not shown) that perform a switching function to provide antenna system 275 with transmit and receive signal paths. In the receive path, received RF signals can be coupled from a multiplexor to a low noise amplifier (not shown) that amplifies the received RF signal and sends the amplified signal to radio system 270.

In an embodiment, radio system 270 may comprise one or more radios that are configured to communicate over various frequencies. In an embodiment, radio system 270 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 270 to baseband system 265.

If the received signal contains audio information, then baseband system 265 decodes the signal and converts it to an analog signal. Then the signal is amplified and sent to a speaker (e.g., I/O device 240). Baseband system 265 also receives analog audio signals from a microphone (e.g., I/O device 240). These analog audio signals are converted to digital signals and encoded by baseband system 265. Baseband system 265 also encodes the digital signals for transmission and generates a baseband transmit audio signal that is routed to the modulator portion of radio system 270. The modulator mixes the baseband transmit audio signal with an RF carrier signal, generating an RF transmit signal that is routed to antenna system 275 and may pass through a power amplifier (not shown). The power amplifier amplifies the RF transmit signal and routes it to antenna system 275, where the signal is switched to the antenna port for transmission.

Baseband system 265 is also communicatively coupled with processor 210, which may be a central processing unit (CPU). Processor 210 is configured with read and write access to data storage areas including main memory 215 and secondary memory 220. Processor 210 is preferably configured to execute instructions (i.e., computer programs, such as the disclosed application, or software modules) that can be stored in main memory 215 or secondary memory 220. Computer programs can also be received from baseband system 265 and stored in main memory 215 or in secondary memory 220, or executed upon receipt. Such computer programs, when executed, enable system 200 to perform the various functions of the disclosed embodiments.

Figure 3:
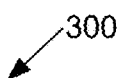
FIG. 3 illustrates an example training process for an example artificial neural network, by which one or more of the processes described herein may be executed, according to an embodiment.
Figure 3:
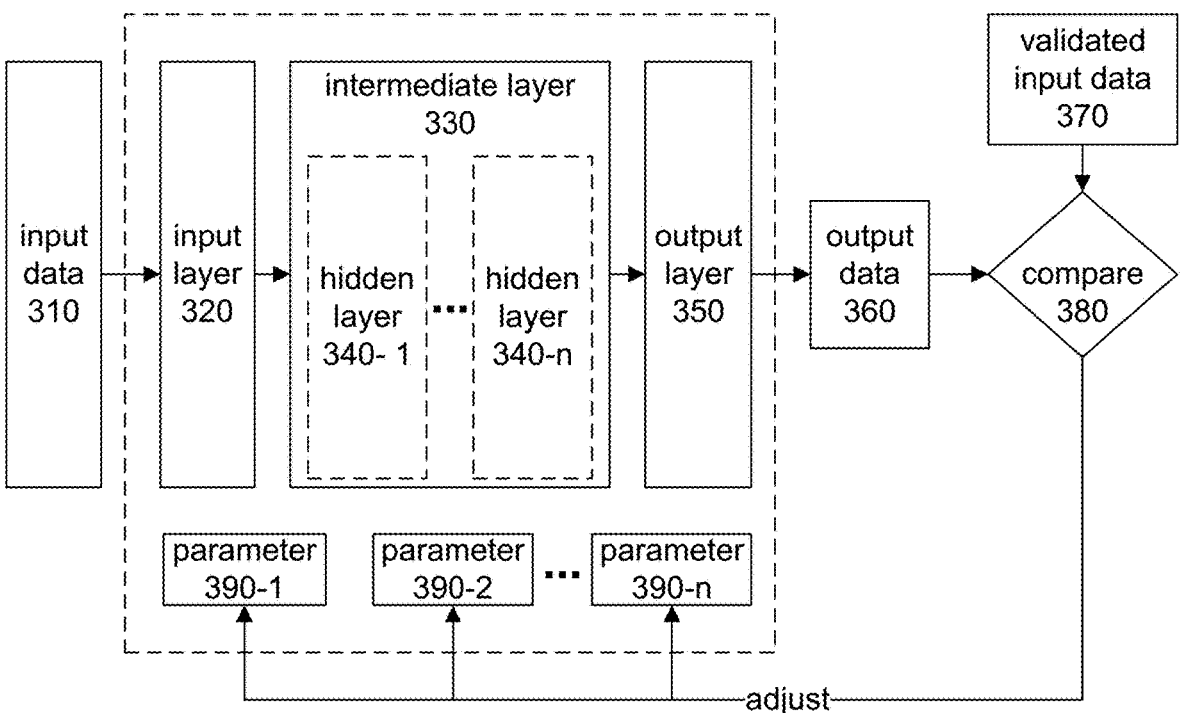

FIG. 3 illustrates an example training process for an example special purpose artificial neural network (ANN) 300, by which one or more of the processes described herein may be executed, according to an embodiment. In the illustrated embodiment, the ANN 300 receives input data 310 at the input layer 320. The input layer 320 processes the input data to generate one or more outputs that are provided to the intermediate layer 330. As the input layer 320 processes the input data 310, the input layer 320 may use one or more parameters 390 (390-1, 390-2, . . . , 390-n) in the processing.

The intermediate layer 330 may comprise a plurality of hidden layers 340 (340-1, . . . , 340-n). Each hidden layer 340 of the intermediate layer 330 receives one or more inputs from the input layer 320 or another hidden layer 340 and processes the one or more inputs to generate one or more outputs that are provided to another hidden layer 340 or to the output layer 350. As each hidden layer 340 performs its processing, the respective hidden layer 340 may use one or more parameters 390 (390-1, 390-2, . . . , 390-n) in the processing. The output layer 350 processes all of the inputs it receives from the various hidden layers 340 of the intermediate layer 330 and generates output data 360. The output data 360 is compared to validated input data 370 and the results of the comparison 380 are used to adjust one or more parameters 390, which can be used in a subsequent iteration of training the ANN. Advantageously, the adjusted parameters 390 operate to improve the subsequent processing of input data 310 by the ANN 300 to generate more accurate output data 360.

FIG. 4 illustrates an example operation of an example special purpose artificial neural network 400, by which one or more of the processes described herein may be executed, according to an embodiment. In the illustrated embodiment, the ANN 400 receives input data 410 at the input layer 420. The input layer 420 processes the input data to generate one or more outputs that are provided to the intermediate layer 430. As the input layer 420 processes the input data 410, the input layer 420 may use one or more parameters 490 (490-1, 490-2, . . . , 490-n) in the processing.

The intermediate layer 430 may comprise a plurality of hidden layers 440 (440-1, . . . , 440-n). Each hidden layer 440 of the intermediate layer 430 receives one or more inputs from the input layer 420 or another hidden layer 440 and processes the one or more inputs to generate one or more outputs that are provided to another hidden layer 440 or to the output layer 450. As each hidden layer 440 performs its processing, the respective hidden layer 440 may use one or more parameters 490 (490-1, 490-2, . . . , 490-n) in the processing. The output layer 450 processes all of the inputs it receives from the various hidden layers 440 of the intermediate layer 430 and generates output data 460.

FIG. 5 is a flow diagram illustrating an example process 500 for converting a video stream to a digital media file having a preferred file format according to an embodiment of the invention. In one aspect, the process of FIG. 5 may be carried out by the system described with respect to FIG. 1 in combination with one of more processing devices described with respect to FIG. 2 that may be executing artificial neural networks that are trained and operated as described in FIGS. 3 and 4.

In the illustrated embodiment the system initially obtains video at 505. The video may be obtained directly from a local camera system or indirectly from a remote camera system. For example the video may come directly from the server system camera or indirectly from a user system camera or an external system camera. Additionally, the video may be prerecorded or livestream. In one aspect, the video comprises a plurality of sequential frames.

Next, at 510 the system obtains a frame from the video. In one aspect, the frame may be the first frame from the video. Alternatively, the system may begin with a frame that is not the first frame.

Next, at 515 the system analyzes the video frame to identify one or more subjects in the content of the video frame. In one aspect, a subject may be identified by having certain characteristics such as movement and/or human body parts such as arms and legs and the like. Additionally, the subject may be any object in the frame, including for example, animated objects capable of movement (e.g., people, animals, robots, etc.), and other moving objects (e.g., vehicles, projectiles, etc.). For each subject identified in the video frame, the system also applies a bounding box to the frame where the bounding box surrounds the identified subject. In one aspect, a bounding box is a perimeter that surrounds a subject in the frame. For example, the subject may be a person and the bounding box may be a rectangle that surrounds the person. Alternatively, the bounding box may be an irregular shaped polygon that surrounds the subject.

In one aspect, for each subject that is surrounded by a bounding box, a color profile may be assigned to the subject. The color profile is advantageously used to uniquely identify the subject in other frames so that the same subject may be individually tracked throughout the frames of the video. Alternative ways to uniquely identify the subject may also be employed, for example, facial recognition.

Next, at 520 the system determines one or more keypoints on each subject in each bounding box applied to the frame. In one aspect, a keypoint may be defined as a joint on a subject or other conspicuous location on a subject including such features as the nose, eyes, ears, belly button (if visible), hips, fingers, toes, and the like. In one aspect, a keypoint may be assigned to one of the following features of a person: nose, left eye inner, left eye, left eye outer, right eye inner, right eye, right eye outer, left ear, right ear, mouth left, mouth right, left shoulder, right shoulder, left elbow, right elbow, left wrist, right wrist, left pinky #1 knuckle, right pinky #1 knuckle, left index #1 knuckle, right index #1 knuckle, left thumb #2 knuckle, right thumb #2 knuckle, left hip, right hip, left knee, right knee, left ankle, right ankle, left heel, right heel, left foot index, and right foot index.

Next, at 525, if there are more frames of the video that need to be processed to identify subjects and apply bounding boxes and apply keypoints, the system loops back to 510 to continue processing the video frame by frame until all frames of the video have been processed and all subjects in the video have been bounded in each frame and the keypoints on each subject have been identified in each frame of the video. Advantageously, keypoints for each subject in the video are applied to the respective subject throughout all frames of the video. In one aspect, a first subject may not appear in all frames of the video and all identified keypoints for the first subject may not appear on the first subject each time the first subject appears on a frame of the video. For example, in one particular frame of the video, the first subject may not be facing the camera and as such, the keypoint for the nose of the first subject may not be applied to that particular frame. In one aspect, an estimated location for an obscured keypoint may be generated and applied to the particular frame.

In one aspect, once the keypoints for a first subject have been applied to all frames of the video, the system may analyze those keypoints to identify and measure certain relative position values for the first subject. For example, the relative distance between the wrist and the elbow or the relative distance between the hips and the knees.

Next, at 530, the keypoints between adjacent frames are smoothed out. For example, in one aspect, in a first frame of the video, a keypoint for the knee of a first subject may have a first (X,Y) location value and the keypoint for the heel of the first subject may have a second (X, Y) location value, where the distance between the first (X, Y) location value and the second (X, Y) location value agrees with a shin length for the first subject. However, in an adjacent frame of the video (e.g., the subsequent frame), the keypoint for the knee of the first subject may have a third (X, Y) location value and the keypoint for the heel of the first subject may still have the second (X, Y) location value such that the distance between the third (X,Y) location value and the second (X,Y) location value disagrees with a shin length for the first subject. In such a situation, the system is configured to adjust the second (X,Y) location value to become a fourth (X,Y) location value for the heel of the first subject so that the distance between the third (X, Y) location value and the fourth (X,Y) location value agrees with the shin length for the first subject.

Next, at 535 the system uses the various keypoints on each frame of the video to isolate the subjects in the video and generate a file in a first format that includes the desirable movement of the subjects in the video and excludes undesirable artifacts from the video. In one aspect, the first file format is a biovision hierarchy (BVH) format.

Next, at 540, the system uses the file in the first format to generate a file in a second format that also includes the desirable movement of the subjects in the video and excludes undesirable artifacts from the video. Alternatively, at 540 the system may use the various keypoints on each frame of the video to isolate the subjects in the video and generate a file in the second format that includes the desirable movement of the subjects in the video and excludes undesirable artifacts from the video. In one aspect, the second file format is a Filmbox (FBX) format.

FIG. 6 is a flow diagram illustrating an alternative example process 600 for converting a video stream to a digital media file having a preferred file format according to an embodiment of the invention. In one aspect, the process of FIG. 6 may be carried out by the system described with respect to FIG. 1 in combination with one of more processing devices described with respect to FIG. 2 that may be executing artificial neural networks that are trained and operated as described in FIGS. 3 and 4.

Initially, at 605 the system obtains video. The video may be obtained directly from a local camera system or indirectly from a remote camera system. For example the video may come directly from the server system camera or indirectly from a user system camera or an external system camera. Additionally, the video may be a prerecorded video obtained from a database or other data storage device. Alternatively, the video may also be a livestream received directly from a camera device or indirectly from an integrated camera device via a communication interface. In one aspect, the video comprises a plurality of sequential frames.

Next, at 610 the system analyzes the video to identify keypoint locations across all frames of the video. In one aspect, identifying keypoints locations comprises identifying one or more subjects in the content of each frame of the video and further identifying one or more keypoints on each subject in each frame and applying all keypoints for a subject to each frame of the video in which the subject appears. As a result, all possible keypoints are considered for each subject and certain keypoints are applied to each subject in each frame of the video, as appropriate.

Next, at 615 the system interpolates missing data and/or adds additional frames. In one aspect, the video comprises a plurality of sequential frames but some of the individual frames may be missing expected keypoints. Accordingly, the system is configured to identify expected keypoints that are missing from a frame and interpolate the location of such keypoints and add the expected keypoints to the subject in the frame. For example, the system may calculate and add keypoints to a subject at the sternum, mid-hip, spinal vertebrae, or other locations that do not already have a keypoint in the particular frame. In one aspect, the system may insert a new frame in order to provide additional keypoints for a subject and smooth out the movement of the subject between adjacent frames of the original video.

Next, at 620, the keypoints between adjacent frames are smoothed out. For example, in one aspect, in a first frame of the video, a keypoint for the knee of a first subject may have a first (X, Y) location value and the keypoint for the heel of the first subject may have a second (X,Y) location value, where the distance between the first (X,Y) location value and the second (X,Y) location value agrees with a shin length for the first subject. However, in an adjacent frame of the video (e.g., the subsequent frame), the keypoint for the knee of the first subject may have a third (X, Y) location value and the keypoint for the heel of the first subject may still have the second (X, Y) location value such that the distance between the third (X, Y) location value and the second (X,Y) location value disagrees with a shin length for the first subject. In such a situation, the system is configured to adjust the second (X,Y) location value to become a fourth (X,Y) location value for the heel of the first subject so that the distance between the third (X, Y) location value and the fourth (X,Y) location value agrees with the shin length for the first subject.

In one aspect, the system adds keypoints and frames as needed to augment the original video. For example, the original video may have been captured at 30 frames per second ("fps") and the processed video file may included added keypoints and added frames that allows the processed video to support 60 fps animation.

Next, at 625 the system applies a desired movement type for each subject in a sequence of frames. In one aspect, each subject in a sequence of frames may be moving in different relative directions or may also be not moving. The system is configured to identify the movement type for each subject across sequences of frames as being one of not moving (e.g., stationary within the sequence of frames), moving in two dimensions (e.g., laterally or vertically within the sequence of frames), or moving in three dimensions (e.g., laterally or vertically and forward or backward within the sequence of frames). Additionally, the system allows a user to declare the desired movement type (e.g., by providing a user defined movement type variable) and the system is configured to apply the user declared movement type to one or more subjects in the video.

Next, at 630 the system deletes unused keypoints. One example of an unused keypoint is a keypoint that will not be used in the conversion from the keypoints to a desired file format. For example, an unused keypoint may be the keypoint for the nose of a subject when the subject is facing away from the camera. Another example of an unused keypoint is a keypoint that is outside the visible are of the frame of the video. For example, a keypoint for the right heel of the subject may have been added to provide continuity of movement of the subject in a sequence of frames when only a portion of the subject appears in each frame in the sequence of frames. Additionally, in some aspects, the type of keypoint skeleton applied to a subject to capture the movement of the subject in the sequence of frames may include a dense set of keypoints on the head of the subject (e.g., eyes, nose, mouth, ears, etc.). Accordingly, when this type of keypoint skeleton is employed, certain keypoints corresponding to certain features on the head of the subject may be unused keypoints that are not used in the conversion to a desired file format and can be deleted.

Next, at 635 the system calculates limb segment length and size for each subject in the video. In one aspect, the system identifies adjacent keypoints on a subject (e.g., elbow and wrist) and applies a length value and/or size value to the limb segment. Advantageously, the system may identify every instance of the limb segment across the entire video and apply a length value to each discrete instance of the limb segment across the entire video and then use an average of all length values for the limb segment as the limb length value for the limb segment.

In one aspect, once the limb segment lengths/sizes are determined for each subject in the video, the system may loop back to 610 and adjust the location of one or more keypoints in accordance with the limb segment lengths.

Next, at 640 the system optionally calculates offsets and rotations for each keypoint. In one aspect, each keypoint in a frame has a position value comprising at least one (X,Y,Z) coordinate. For example, a single keypoint may have an (X,Y,Z) value in pixel dimensions as measured from the top left corner of the frame and the same single keypoint may also have an (X,Y,Z) value in real world dimensions as measured, for example, in meters relative to a landmark. In one aspect, the offset for a keypoint is the distance (e.g., in pixels or meters) from the current location of the keypoint as compared to the location of a root keypoint. For example, the root keypoint for a subject may be a mid-hip point on the body of the subject and the offset of the right wrist keypoint for the subject is a distance from the right wrist keypoint to the right elbow keypoint. In an alternative aspect, the offset of the right wrist keypoint for the subject is a distance from the right wrist keypoint to the right elbow keypoint to the right shoulder keypoint to the sternum keypoint to the mid-hip keypoint. The system is advantageously configured to calculate the offset.

The system is also configured to calculate the rotation of the keypoint that corresponds to the relative position of the body part the keypoint represents. For example, as a subject may remain stationary in 3D over a sequence of frames (e.g. no movement laterally or vertically or forward or backward) but the subject may also turn her palm from facing the camera to facing away from the camera. Such movement would result in, e.g., the keypoint for the thumb to move its location from one side to the other. However, such movement would not change the location of the keypoint for the wrist. Accordingly, the system calculates, for example, the rotation of the keypoint for the wrist of the subject for each frame in the sequence to reflect its new orientation in each frame even though the location of the keypoint did not change.

Next, at 645 the system optionally uses the various keypoints in each frame of the video to isolate the subjects in the video and generate a file in a first format. In one aspect, the file in the first format includes the desirable movement of the subjects in the video and excludes undesirable artifacts from the video. In one aspect, the first file format is a biovision hierarchy (BVH) format.

Next, at 650 the system optionally converts the keypoints to a three dimensional coordinate system. In one aspect, the system uses the offsets and rotations for a keypoint to calculate the location of the keypoint in a 3D coordinate system.

Next, at 655, for each subject in each frame, the system adjusts the relative locations of the keypoints to ensure that the subject appropriately maintains contact with any surface that may be supporting the subject. In one aspect, the surface may be the ground or the floor or two stairs. Alternatively, the surface may be a chair the subject is sitting on or a tree limb from which the subject is hanging.

Next, at 660 the system optionally converts the keypoints to offsets and rotations.

Next, at 665 the system uses the various keypoints in each frame of the video to isolate the subjects in the video and generate a file in the first format. This may be the first instance of writing the keypoints to a file in the first format or it may be a subsequent writing of the keypoints to a file in the first format. In one aspect, the file in the first format includes the desirable movement of the subjects in the video and other desirable elements such as the supporting surface, and excludes undesirable artifacts from the video. In one aspect, the first file format is a biovision hierarchy (BVH) format.

Next, at 670 the system uses the file in the first format to generate a file in a second format that also includes the desirable movement of the subjects in the video and other desirable elements and excludes undesirable artifacts. In one aspect, the second file format is a Filmbox (FBX) format. They may alternatively use the various keypoints to directly write the file in the second format.

FIG. 7 is a flow diagram illustrating an example process 700 for converting keypoints from a video stream to one or more digital media files having a preferred file format and converting the one or more digital media files having a preferred file format to other preferred file formats and converting the one or more digital media files having a preferred file format back to keypoints according to an embodiment of the invention. In one aspect, the process of FIG. 7 may be carried out by the system described with respect to FIG. 1 in combination with one of more processing devices described with respect to FIG. 2 that may be executing artificial neural networks that are trained and operated as described in FIGS. 3 and 4.

Initially, at 705 the system writes the various keypoints from a video (or a subset of sequential frames from a video) to a digital media file having a first file format. In one aspect, the process of writing the keypoints to the first file format converts the relative location information for each keypoint from an (X,Y,Z) coordinate system to an (offset, rotation)

coordinate system where each keypoint has an offset and a rotation relative to its parent keypoint (i.e., the same keypoint in the immediately preceding adjacent frame). In one aspect, the first file format is the BVH format.

Next, at 710, the system writes the various keypoints to a digital media file having a second file format. In one aspect, the process of writing the keypoints to the second file format converts the relative location information for each keypoint from an (X,Y,Z) coordinate system to a different form of (offset, rotation) coordinate system where each keypoint has an offset and a rotation relative to its parent keypoint (e.g., a root keypoint on the subject's body). In one aspect, the second file format is the FBX format.

Next, at 715, the system converts the digital media file having the first file format to the digital media file having the second file format.

Next, at 720, the system converts the digital media file having the first file format back to keypoints.

Next, at 725, the system converts the digital media file having the second file format to the digital media file having the first file format.

Next, at 730, the system converts the digital media file having the second file format back to keypoints.

In operation, the system first converts the keypoints to a digital media file having one of a plurality of file formats. The system may proceed sequentially to convert keypoints to a digital media file having a first file format and convert a digital media file having a first file format to a digital media file having a second file format and convert a digital media file having a second file format to a digital media file having a first file format and convert a digital media file having a first or second file format back to keypoints. The system may also proceed in parallel to convert keypoints to a digital media file having a first or second file format and convert a digital media file having a first file format to a digital media file having a second file format and convert a digital media file having a second file format to a digital media file having a first file format and convert a digital media file having a first or second file format back to keypoints. The process 700 may also be implemented iteratively to proceed through a plurality of conversions between keypoints and digital media files having various different file types such that multiple conversions are carried out.

In one aspect, an advantage of plural conversions between keypoints and digital media files having various file types is that the orientation and location of the keypoints can be adjusted and improved with each conversion. For example, converting keypoints into a digital media file having a first file type may involve transforming the keypoints from a cartesian coordinate system into an offset and rotation system that improves the relative positioning of the keypoints based, e.g., on the known length of a limb segment. Converting the digital media file having the first file format back to keypoints provides an additional advantage of simplicity in adjusting the relative location of the keypoints using a cartesian coordinate system. In sum, the plural conversions between keypoints and digital media files having various file types and the corresponding adjustments made to the relative positioning of the keypoints results in significantly smoother motion across a sequence of frames of the video and a vastly improved digital media file output.

FIG. 8 is a flow diagram illustrating an example process 800 for generating a movement pattern according to an embodiment of the invention. In one aspect, the process of FIG. 8 may be carried out by the system described with respect to FIG. 1 in combination with one of more processing devices described with respect to FIG. 2 that may be executing artificial neural networks that are trained and operated as described in FIGS. 3 and 4.

Initially, at 805 the system analyzes a sequence of frames from the video stream. Notably, the video stream comprises a sequence of frames and the source of the video stream may be a prerecorded video file or livestream video content.

Next, at 810 the system identifies one or more subjects in each frame of the sequence of frames.

Next, at 815 the system identified one or more keypoints on each subject in each frame of the sequence of frames. In one aspect, a subject is identified as any discrete object that exhibits movement across a sequence of frames.

Next, at 820 the system propagates the keypoints for each respective subject to the same respective subject in all frames of the sequence of frames in which the subject appears.

Next, at 825 the system analyzes the relative movement of each subject's keypoints across all frames in the sequence of fames to identify one or more movement patterns. Importantly, the system analyzes the relative movement of a single subject's keypoints across all frames to identify one or more movement patterns for each individual subject. Additionally, the system analyzes the relative movement of a combination of subjects' keypoints across all frames to identify one or more movement patterns for the combinations of subjects. Accordingly, the system may identify both individual and group movement patterns. For example, in a video of a marching band conducting a halftime performance, there would be individual movement patterns, sub-group movement pattern, and entire group movement patterns.

Next, at 830 the system associates a tag or other label with the movement pattern. For example, if the content of the video includes a subject (e.g., a dancer) doing the moonwalk as a portion of a dance performance, the relative movement of the subject's keypoints during those frames that comprise the moonwalk portion of the dance performance are isolated and identified as a movement pattern at 825 and then at 830, that movement pattern is assigned the label "moonwalk." Additional movement patterns identified at 825 are also labeled at 830, where a labeled movement pattern might be an individual movement pattern, a sub-group movement pattern, or an entire group movement pattern. Next, at 835, the movement pattern is stored in a memory.

FIG. 9 is a flow diagram illustrating an example process 900 for searching video for matching movement patterns according to an embodiment of the invention. In one aspect, the process of FIG. 9 may be carried out by the system described with respect to FIG. 1 in combination with one of more processing devices described with respect to FIG. 2 that may be executing artificial neural networks that are trained and operated as described in FIGS. 3 and 4.

Initially, at 905, the system receives an input comprising a search term. The search term may be received via a user input into an application (e.g., a video search tool) that is executing on an external system or the search term may be received from a user input into an application that is executing on a user system, or the search term may be received from a user input into an application that is executing on the platform (e.g., a server system).

Next, at 910 the system identifies one or more movement patterns that correspond to the search term. In one aspect, the received search term may be constrained to be selected from a predetermined list of search terms that correspond to a movement pattern. Alternatively, the system may be configured to accept any search term and use natural language processing to analyze the search term and correlate the search term to the closest movement pattern that corresponds to the search term.

Next, at 915, the system searches one or more databases to identify one or more video files or motion files that include movement that corresponds to the search term. For example, in one aspect, the system searches one or more databases for one or more video files that have a tag that corresponds to the movement pattern most closely associated with the search term. Such tags are associated with a video file as a result of preprocessing that analyzes the content of the video file and identifies one or more movement patterns that are included in the video file and then associates one or more tags with the video file, where each tag corresponds to a particular movement pattern.

Alternatively, or in addition, the system may also analyze stored video files that have not been preprocessed and/or livestream video (also not preprocessed) to determine whether the movement pattern most closely associated with the search term is included in the content of the livestream video and/or stored video files that have not been preprocessed.

Next, at 920, the system returns a response to the input that identifies one or more video files or motion files that match the search term. In one aspect, the response may include one or more links to the one or more video files or motion files. Additionally, in a case where a livestream video matches the search term, the system may first save the livestream as a video file before responding to the input to identify the newly saved video file.

FIG. 10 is a flow diagram illustrating an example process 1000 for analyzing a video stream to identify desirable or undesirable movement patterns according to an embodiment of the invention. In one aspect, the process of FIG. 10 may be carried out by the system described with respect to FIG. 1 in combination with one of more processing devices described with respect to FIG. 2 that may be executing artificial neural networks that are trained and operated as described in FIGS. 3 and 4.

Initially, at 1005 the system analyzes a sequence of frames from the video stream. Notably, the video stream comprises a sequence of frames and the source of the video stream may be a prerecorded video file or livestream video content.

Next, at 1010 the system identifies one or more subjects in each frame of the sequence of frames.

Next, at 1015 the system identified one or more keypoints on each subject in each frame of the sequence of frames. In one aspect, a subject is identified as any discrete object that exhibits movement across a sequence of frames.

Next, at 1020 the system propagates the keypoints for each respective subject to the same respective subject in all frames of the sequence of frames in which the subject appears.

Next, at 1025 the system analyzes the relative movement of each subject's keypoints across all frames in the sequence of fames to identify one or more movement patterns. Importantly, the system analyzes the relative movement of a single subject's keypoints across all frames to identify one or more movement patterns for each individual subject. Additionally, the system analyzes the relative movement of a combination of subjects' keypoints across all frames to identify one or more movement patterns for the combinations of subjects. Accordingly, the system may identify both individual and group movement patterns. For example, in a video of a marching band conducting a halftime performance, there would be individual movement patterns, sub-group movement patters, and entire group movement patterns.

Next, at 1030 the system compares the identified movement patterns to one or more known movement patterns.

Finally, at 1035 the system reports the results of the video stream analysis and any identified movement patterns. In operation, this example process for analyzing a video stream to identify desirable or undesirable movement patterns can be used by the system, for example, to analyze livestream video of employees performing a heavy lifting task such as loading boxes into a vehicle. Advantageously, the system is configured to analyze the livestream video and identify the lifting movement pattern and report any unsafe behavior exhibited by employees while performing the heavy lifting task and perhaps also report exemplary behavior exhibited by employees while performing the heavy lifting task.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for markerless motion capture comprising:
an image capture apparatus configured to obtain video including live movement of a first subject, wherein the video includes a plurality of sequential frames;
a bounding module configured to analyze one or more frames of the video and identify the first subject in one or more frames of the video and apply a bounding box around the first subject in each of the one or more frames of the video;
an estimation module configured to analyze each of the one or more frames of the video having a bounding box around the first subject and estimate a location for each of a plurality of keypoints on the first subject;
a conversion module configured to convert the estimated location for the plurality of keypoints from each frame of the video containing at least one keypoint into a digital media file having a first file format;
the conversion module further configured to convert the digital media file in the first file format into a digital media file having a second file format; and
a data storage apparatus configured to save the digital media file in the first file format and save the digital media file in the second file format.

2. The system of claim 1, wherein the image capture apparatus is a camera configured to capture live movement of the first subject.

3. The system of claim 1, wherein the first file format is a biovision hierarchy (BVH) format.

4. The system of claim 1, wherein the second file format is a Filmbox (FBX) format.

5. The system of claim 1, further comprising a pattern module configured to analyze a plurality of keypoints in a plurality of sequential frames of the video and identify a movement pattern comprising a relative position of a plurality of keypoints in a plurality of sequential frames.

6. The system of claim 5, wherein the image capture apparatus further configured to obtain video including live movement of a plurality of subjects.

7. The system of claim 6, wherein the movement pattern comprises the relative position of a first plurality of keypoints corresponding to a first subject in a plurality of sequential frames and the relative position of second plurality of keypoints corresponding to a second subject in the plurality of sequential frames.

8. The system of claim 1, wherein the conversion module is further configured to convert the estimated location for the plurality of keypoints from each frame of the video containing at least one keypoint into the digital media file having the second file format.

9. The system of claim 1, wherein the conversion module is further configured to improve smoothness of motion in the digital media file having the first file format by converting the digital media file having the first file format into a reconverted plurality of keypoints and converting the reconverted plurality of keypoints into an improved digital media file having the first file format.

10. The system of claim 1, wherein the plurality of keypoints on the first subject represent the first subject in three dimensional space.

11. A method for converting markerless motion capture comprising:

obtaining video including live movement of a first subject, wherein the video includes a plurality of sequential frames;

identifying the first subject in one or more frames of the video;

applying a bounding box around the first subject in each of the one or more frames of the video;

estimating a location for each of a plurality of keypoints on the first subject in each bounding box around the first subject in each of the one or more frames of the video;

converting the estimated location for the plurality of keypoints from each frame of the video containing at least one keypoint into a digital media file having a first file format;

converting the digital media file in the first file format into a digital media file having a second file format; and storing the digital media file in the first file format and storing the digital media file in the second file format.

12. The method of claim 11, wherein the video is obtained from a live video feed.

13. The method of claim 11, wherein the video is prerecorded and obtained from data storage.

14. The method of claim 11, wherein the first file format is a biovision hierarchy (BVH) format.

15. The method of claim 11, wherein the second file format is a Filmbox (FBX) format.

16. The method of claim 11, further comprising analyzing a plurality of keypoints in a plurality of sequential frames of the video to identify a movement pattern, wherein the movement pattern comprises relative positions of a plurality of keypoints in a plurality of sequential frames.

17. The method of claim 16, wherein the movement pattern comprises the relative position of a first plurality of keypoints corresponding to a first subject in a plurality of sequential frames and the relative position of second plurality of keypoints corresponding to a second subject in the plurality of sequential frames.

18. The method of claim 11, further comprising, prior to converting the estimated location for the plurality of keypoints to the first file format and prior to converting the first file format to the second file format, adjusting a location of a first keypoint in a first frame relative to a location of the first keypoint in a second frame that is adjacent to the first frame such that a distance between the first keypoint in the first frame and a second keypoint in the first frame is substantially equal to a distance between the first keypoint in the second frame and the second keypoint in the second frame.

19. The method of claim 11, further comprising converting the digital media file having the first file format into a reconverted plurality of keypoints and converting the reconverted plurality of keypoints into an improved digital media file having the first file format.

20. The method of claim 11, wherein the plurality of keypoints on the first subject represent the first subject in three dimensional space.

* * * * *